United States Patent [19]

Allen

[11] 4,021,666

[45] May 3, 1977

[54] NEUTRON-NEUTRON LOGGING FOR BOTH POROSITY AND MACROSCOPIC ABSORPTION CROSS SECTION

[75] Inventor: Linus S. Allen, Dallas, Tex.

[73] Assignee: Mobil Oil Corporation, New York, N.Y.

[22] Filed: Aug. 18, 1975

[21] Appl. No.: 605,686

[52] U.S. Cl. .............................. 250/265; 250/269
[51] Int. Cl.$^2$ ........................................ G01V 5/00
[58] Field of Search .......... 250/265, 266, 269, 270, 250/264

[56] References Cited

UNITED STATES PATENTS

| | | | |
|---|---|---|---|
| 3,462,600 | 8/1969 | Dewan | 250/266 X |
| 3,491,238 | 1/1970 | Allen | 250/266 |
| 3,567,935 | 3/1971 | Nagel | 250/264 |
| 3,567,936 | 3/1971 | Tittman | 250/264 |
| 3,691,378 | 9/1972 | Hopkinson et al. | 250/270 X |
| 3,906,224 | 9/1975 | Scott et al. | 250/269 X |
| 3,914,603 | 10/1975 | Paap et al. | 250/269 X |

*Primary Examiner*—Davis L. Willis
*Attorney, Agent, or Firm*—C. A. Huggett; George W. Hager, Jr.

[57] ABSTRACT

A borehole logging tool includes a fast neutron source and at least two thermal neutron detectors spaced apart from the source. A count rate meter is connected to each thermal neutron detector. A ratio detector provides an indication of the porosity of the formation surrounding the borehole by determining the ratio of the outputs of the two count rate meters. A comparison unit provides a signal indicative of the macroscopic absorption cross section of the formation by comparing the indicated porosity with at least one of the count rate signals.

9 Claims, 2 Drawing Figures

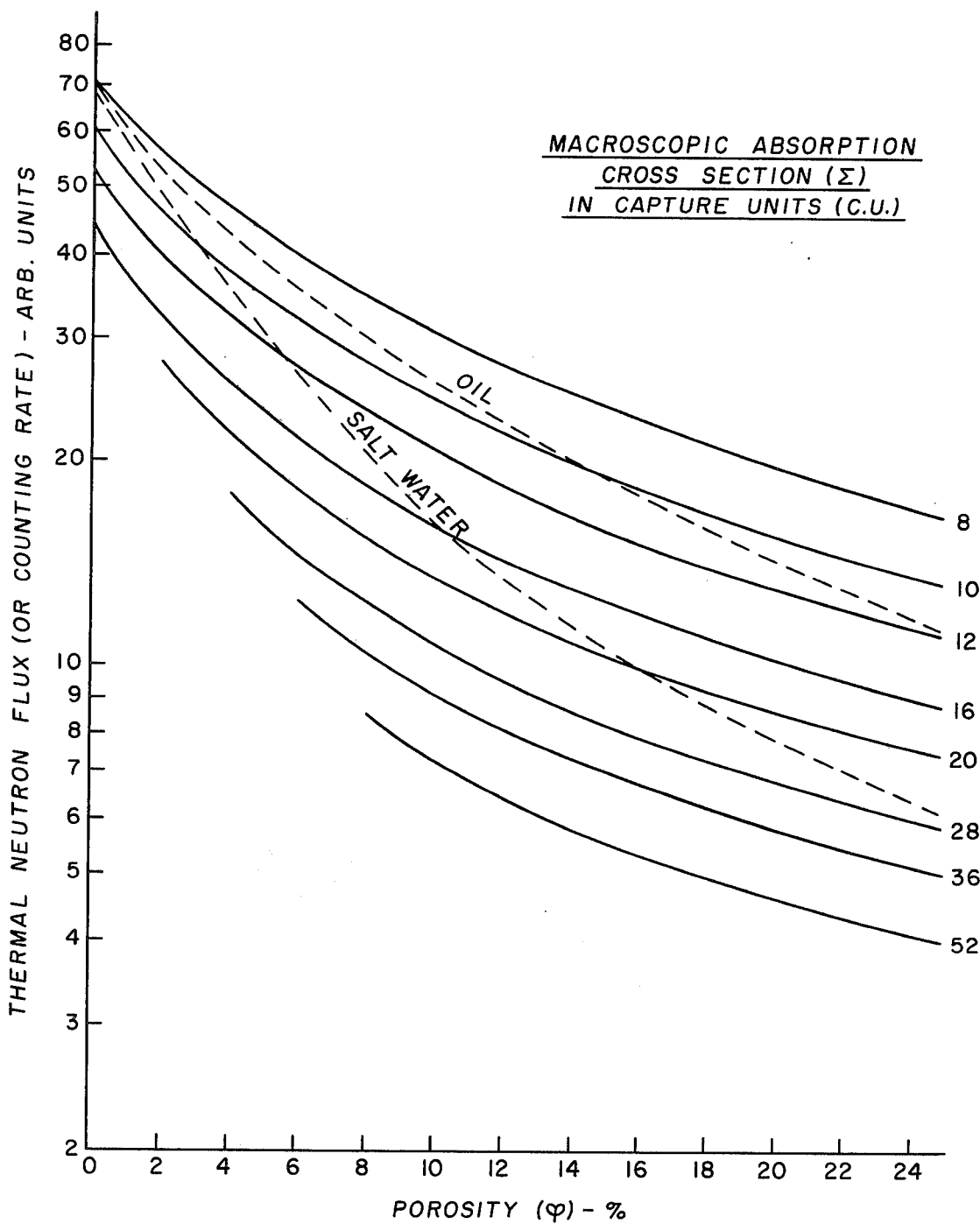

NEUTRON-NEUTRON LOGGING FOR BOTH POROSITY AND MACROSCOPIC ABSORPTION CROSS SECTION

BACKGROUND OF THE INVENTION

This invention relates to neutron-neutron logging and more particularly to a borehole logging system for use in simultaneously determining both the porosity of the formation surrounding the borehole and the macroscopic absorption cross section of the formation surrounding the borehole.

In such neutron-neutron logging, a fast neutron source irradiates the formations surrounding the borehole. The resulting secondary radiation is measured by at least one thermal neutron detector axially spaced from such source within the borehole. In U.S. Pat. No. 3,491,238 entitled POROSITY LOGGING EMPLOYING TWO THERMAL NEUTRON DETECTORS SPACED RELATIVELY FAR FROM NEUTRON SOURCE, issued Jan. 20, 1970, to Linus S. Allen, there is disclosed a neutron-neutron logging system in which two thermal neutron detectors are spaced apart at distances from a steady-state neutron source where the ratio of the thermal neutron flux measured by the two detectors is influenced more by epithermal neutron parameters than thermal neutron parameters. The ratio of the thermal neutron flux detected at such distances is therefore a measure predominantly of a single epithermal neutron parameter of the formations, i.e., the slowing down length, which is indicative of porosity.

SUMMARY OF THE INVENTION

In accordance with the present invention a new and improved neutron-neutron logging system is provided for determining not only the porosity of the formation surrounding the borehole but also the macroscopic absorption cross section of the formation. A pair of thermal neutron detectors are located within the borehole at spaced-apart positions from a steady-state neutron source where the ratio of the thermal neutron flux measured by the detectors is influenced more by epithermal neutron parameters than thermal neutron parameters. A pair of count rate meters produce two count rate signals representative of the thermal neutron flux measurements of the pair of thermal neutron detectors. The ratio of the two count rate signals is taken to provide an indication predominantly of the formation porosity. This ratio is then compared with at least one of the count rate signals which is indicative of thermal neutron flux to produce a signal representative of the macroscopic absorption cross section of the formation in accordance with a predetermined relationship between porosity and thermal neutron flux.

BRIEF DESCRIPTION OF THE DRAWINGS

FIG. 2 illustrates in graphical form characteristics of an example subsurface formation as might be encountered when logging with the borehole system of FIG. 1.

DESCRIPTION OF THE PREFERRED EMBODIMENT

In U.S. Pat. No. 3,491,238 to Linus S. Allen there is disclosed a dual detector neutron-neutron logging system for determining the volume fraction of a subsurface formation occupied by fluid (i.e., porosity). Such patent teaches that the ratio of the thermal neutron flux measurements taken by two thermal neutron detectors spaced at relatively large distances from a fast neutron source within a borehole is indicative of the porosity of the formation.

The present invention is directed to an improvement in such a dual detector neutron-neutron logging system such that an additional volume fraction may be determined, that being the volume fraction of the fluid which is in a hydrocarbon phase, that is, the amount of saturation of the formations surrounding the borehole by oil or gas. Theoretically, hydrocarbon saturation can be represented by the following expressions where the hydrocarbon is, for example, oil:

$$\Sigma_{formation} = \Sigma_{rock}(1-\phi) + \Sigma_{fluid}\phi \quad (1)$$

$$\Sigma_{fluid} = \Sigma_{oil} S_{oil} + \Sigma_{water} S_{water} \quad (2)$$

$$S_{oil} = 1 - S_{water} \quad (3)$$

where,
$\Sigma$ represents macroscopic absorption cross section,
$S$ represents saturation (or volume fraction of the particular fluid in place), and
$\phi$ represents porosity.

By rewriting Equation (1) in the terms of Equations (2) and (3), the oil saturation $S_{oil}$ can be represented as follows:

$$S_{oil} = \frac{\Sigma_{formation} - \Sigma_{rock}(1-100) - \Sigma_{water}\phi}{\phi(\Sigma_{oil} - \Sigma_{water})} \quad (4)$$

Of the five variables on the right-hand side of Equation (4) required for the determination of oil saturation $S_{oil}$, the macroscopic absorption cross sections of rock ($\Sigma_{rock}$), oil ($\Sigma_{oil}$), and water ($\Sigma_{water}$) are known or estimable, while the porosity ($\phi$) and macroscopic absorption cross section of the formation ($\Sigma_{formation}$) must be measured within the borehole.

It is the specific feature of the present invention that a dual detector neutron-neutron logging system such as disclosed in U.S. Pat. No. 3,491,238 be improved to provide measurements not only for $\phi$ but also for $\Sigma_{formation}$ without incorporating an additional thermal neutron detector or making additional passes through the borehole with the borehole tool. Both these measurements can be obtained by the new and improved dual detector neutron-neutron logging system illustrated in FIG. 1 in a single pass of the borehole tool through the borehole.

Figure 1:
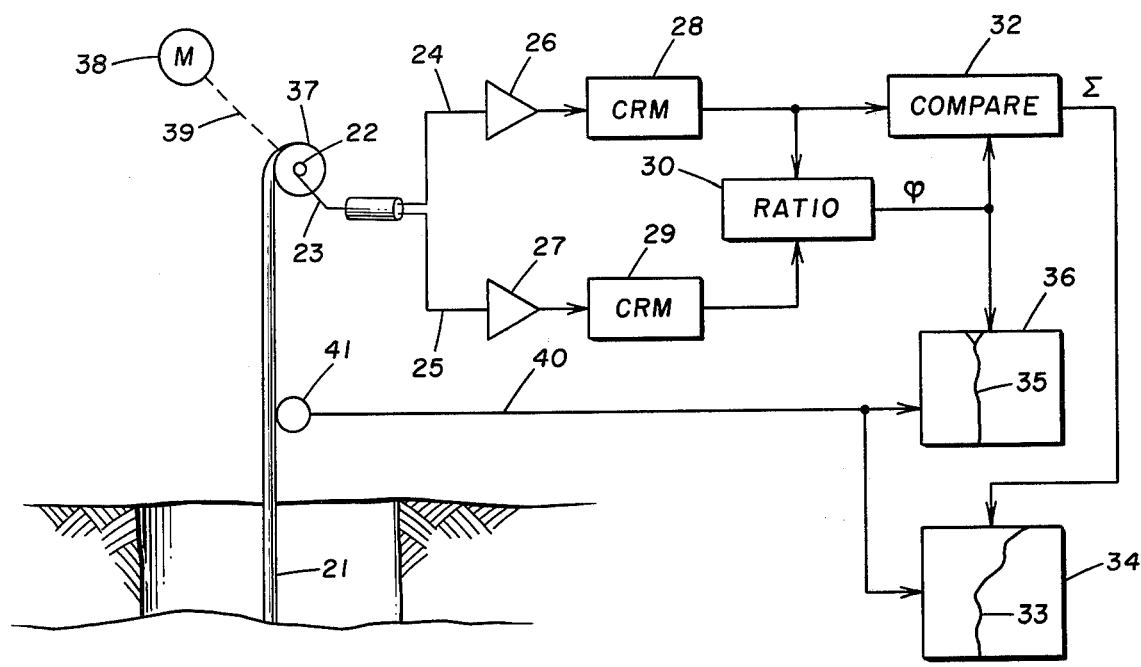
FIG. 1 illustrates a borehole system for carrying out the present invention.
Figure 1:
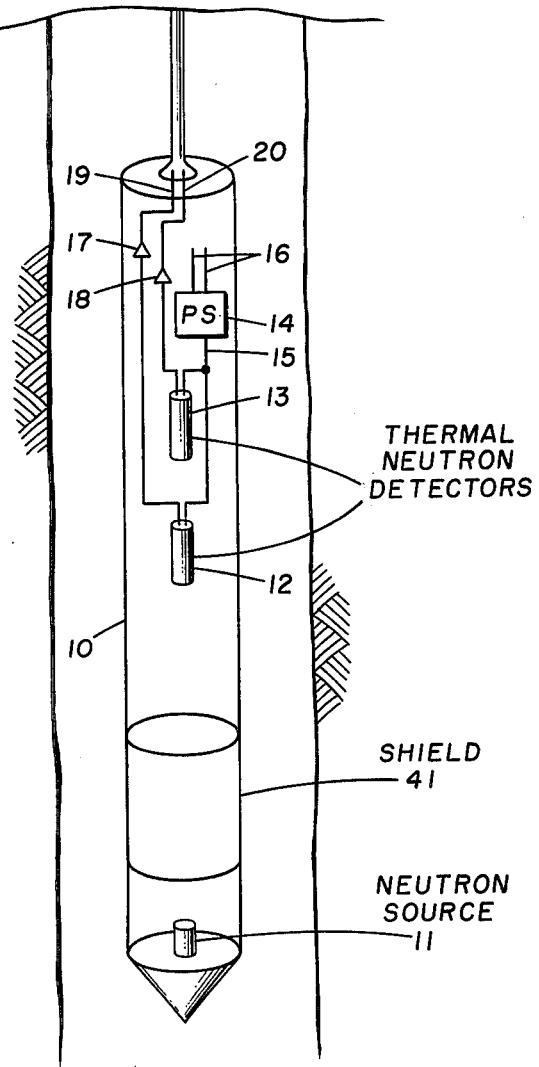

Referring now to FIG. 1, the borehole logging tool 10 has a fast neutron source 11 for irradiating the formations and two spaced-apart thermal neutron detectors 12 and 13 for detecting thermal neutrons. The neutron source 11 preferably is a steady-state Am-Be or Pu-Be fast neutron source with an average energy of about 4 million electron volts. The thermal neutron detectors 12 and 13 may be proportional counters of the type disclosed in U.S. Pat. No. 3,102,198 to Bonner and filled with six atmospheres of helium-3 gas. Detectors of this type are very sensitive to thermal neutrons. A shield 41 protects the thermal neutron detectors 12 and 13 from directed neutron radiation from the neutron source 11. A power supply 14 is located within the borehole tool 10 for supplying power to the thermal neutron detectors 12 and 13 by way of conductor 15. Current is applied to the power supply 14 from the surface by way of conductors 16. The outputs of the thermal neutron detectors 12 and 13 are applied to amplifiers 17 and 18 which in turn are coupled to conductors 19 and 20 included in the cable 21. At the surface, the outputs from conductors 19 and 20 are applied by way of the slip rings 22 and brushes 23 to conductors 24 and 25 which extend to amplifiers 26 and 27, respectively. The outputs of amplifiers 26 and 27 are applied to the count rate meters 28 and 29, respectively, whose outputs are representative of the thermal neutron fluxes measured by the thermal neutron detectors.

The outputs of the count rate meters 28 and 29 are applied to the ratio detector 30. As taught in U.S. Pat. No. 3,491,238, the taking of the ratio of the count rates of the two count rate meters provides a signal which is independent of thermal neutron parameters of the formation but which is, however, a measure predominantly of the epithermal neutron parameter of the formation, that is, the slowing down length which is indicative of the formation porosity. Consequently, the output of ratio detector 30 represents porosity. Ratio detector 30 may be of a conventional type as disclosed in ELECTRONIC ANALOG COMPUTERS, Gravino A. Korn and Theresa M. Korn, McGraw-Hill Book Company, Inc., New York, 1956, pages 338–339.

In accordance with the improvement provided by the present invention, the output of at least one of the count rate meters 28 and 29 is compared by means of a comparison unit 32 to the output of the ratio detector 30 in such a way as to provide a signal indicative of the macroscopic absorption cross section of the formation, $\Sigma_{formation}$. This comparison can best be understood in view of the following theoretical considerations taken in conjunction with FIG. 2. In neutron-neutron logging there are two important neutron groups, epithermal neutrons (energies above 1 electron volt) and thermal neutrons (energies less than 1 electron volt). For a point source in an infinite, homogeneous medium, the thermal neutron flux detected by a thermal neutron detector can be represented as follows for large source-to-detector spacings:

$$\Phi_t(r) = \frac{Q L_t^2}{4\pi D_t (L_e^2 - L_t^2)} \times \frac{e^{-r/L_e}}{r} \quad (5)$$

where, $\Phi_t$ is the thermal neutron flux,
$r$ is the radial distance from the source,
$Q$ is the point neutron source strength,
$D_t$ is the thermal neutron diffusion coefficient,
$L_e$ is the slowing down length, and
$L_t$ is the thermal neutron diffusion length.

$L_e$ is principally determined by the concentration of hydrogen in the formation and is affected only slightly by changes in formation fluid salinity. $L_t$, on the other hand, decreases rapidly with increasing salinity of the formation fluid. Hence, in accordance with Equation (5), it can be seen that at a fixed distance $r$ from the neutron source, and with a constant fluid volume fraction or porosity (i.e., constant $L_e$), the thermal neutron flux is significantly reduced when the pore space contains salt water rather than hydrocarbons. The effect of formation fluid salinity for the example of a limestone traversed by an 8-inch diameter, fresh-water-filled borehole is illustrated in FIG. 2. The thermal neutron flux is represented as being detected by a thermal neutron detector spaced 63 cm. from the source. Solid curves define a known relationship between the thermal neutron flux, porosity, and macroscopic absorption cross sections ($\Sigma$) for the formation and its fluids. Two particular cases are illustrated by dashed curves. The upper dashed curve corresponds to a limestone having $\Sigma_{rock} = 8$ capture units (c.u.) which is saturated with an oil having $\Sigma_{fluid} = 22$ c.u. The lower dashed curve corresponds to the same limestone ($\Sigma_{rock} = 8$ c.u.) with the pore space being saturated with a brine containing 150,000 ppm NaCl and having $\Sigma_{fluid} = 78$ c.u. Points lying between these two curves, determined by a simultaneous flux and porosity measurement, clearly define a unique value of macroscopic absorption cross section and an intermediate case of oil saturation. Consequently, the macroscopic absorption cross section of the formation may be determined in accordance with a known relationship between the measured values of both porosity and thermal neutron flux.

It will be apparent to those skilled in the art that the comparison unit 32 can be calibrated in terms of a known relationship for both porosity and thermal neutron flux that may be either theoretically or experimentally determined so as to yield the true value of the macroscopic cross section of the formation when the measured values of both porosity and thermal neutron flux are applied to its inputs.

Preferably, the comparison unit 32 includes at least one operational amplifier to which are applied both the porosity and thermal neutron flux measurements. Feedback and biasing resistors are selected for calibrating the output signal from the operational amplifier for the theoretically or experimentally determined values for such porosity and thermal neutron flux. In this type configuration, the comparison unit 32 determines the relative values to the measured porosity and measured thermal neutron flux and provides an output signal representative of the macroscopic absorption cross section for the formation and its fluids.

This macroscopic absorption cross section determination, $\Sigma$, of the comparison unit 32 is recorded in correlation with the depth of the formation as the trace 33 on the recorder 34. Also, the porosity measurement $\phi$ of the ratio detector 30 is recorded in correlation with the depth of the formation as the trace 35 on the recorder 36. Both recorders 34 and 36 are continuous-trace recorders having charts driven continuously in correlation with depth by way of mechanical connection 40 and measuring reel 41 coupled to cable 21. Cable 21 is wound and unwound upon drum 37 driven by motor 38 and mechanical connection 39 to move the borehole tool 10 through the borehole.

Having now measured both the porosity and the macroscopic absorption cross section of the formation in accordance with the new and improved dual detector neutron-neutron logging system of the present invention, the amount of saturation of the formations surrounding the borehole by hydrocarbons (e.g., oil or gas) may be determined from the expression of Equation (4).

In the foregoing-described preferred embodiment, the detectors 12 and 13 are thermal neutron detectors utilized for measuring thermal neutron flux that represents predominantly the thermal neutron parameters of the formation being logged. In an alternate embodiment, this same thermal neutron flux measurement may be carried out by the use of gamma-ray detectors that measure the thermal neutron capture gamma rays emitted by the formation. It is therefore to be understood that within the scope of the appended claims the measurement of thermal neutron flux representing predominantly the thermal neutron parameters of the formation may be carried out by either the detection of thermal neutrons or thermal neutron capture gamma rays.

I claim:

1. A method of logging the formations traversed by a borehole, comprising the steps of:
    a. locating a fast source of neutrons within the borehole to irradiate the formations with neutrons,
    b. simultaneously measuring the thermal neutron flux within said borehole at two spaced-apart positions where the ratio of the thermal neutron flux measurements is influenced predominantly by epithermal neutron parameters,
    c. producing a ratio of the thermal neutron flux measurements at each of said two spaced-apart positions within the borehole, and
    d. comparing the ratio of the thermal neutron flux measurements to at least one of said thermal neutron flux measurements in accordance with a known relationship to provide an indication of the macroscopic absorption cross section of the formation and its fluids.

2. The method of claim 1 wherein the step of measuring thermal neutron flux comprises the producing of count rates of the thermal neutrons arriving at each of said spaced-apart positions within the borehole.

3. The method of claim 1 wherein the step of measuring thermal neutron flux comprises the producing of count rates of the thermal neutron capture gamma rays arriving at each of said spaced-apart positions within the borehole.

4. A method of logging the formations traversed by a borehole for porosity and macroscopic absorption cross section, comprising the steps of:
    a. locating a fast source of neutrons within the borehole to irradiate the formations with neutrons,
    b. simultaneously measuring thermal neutron flux within said borehole at two spaced-apart positions where the ratio of the thermal neutron flux measurements is influenced more by epithermal neutron parameters than thermal neutron parameters,
    c. producing two count rate signals representative of the thermal neutron flux detected at said two positions,
    d. combining said count rate signals to produce a first output signal representative of the ratio of said count rate signals and indicative predominantly of the porosity of the formations, and
    e. combining said first output signal with at least one of said count rate signals to produce a second output signal representative of the macroscopic cross section of the formations in accordance with a known relationship between said first output signal and said count rate signal.

5. The method of claim 4 wherein the step of measuring thermal neutron flux comprises the producing of count rates of the thermal neutrons arriving at each of said spaced-apart positions within the borehole.

6. The method of claim 4 wherein the step of measuring thermal neutron flux comprises the producing of count rates of the thermal neutron capture gamma rays arriving at each of said spaced-apart positions within the borehole.

7. The method of claim 4 further including the step of recording both said first and second output signals in correlation with depth as indications of porosity and macroscopic cross section of the formations, respectively.

8. A system for logging the formations traversed by a borehole, comprising:
    a. a borehole tool,
    b. means for moving said borehole tool through a borehole,
    c. a source of fast neutrons located within said borehole tool for irradiating the formations surrounding the borehole with neutrons,
    d. first and second thermal neutron detectors located within said borehole tool at spaced-apart positions from said source such that the measurements of the ratio of the thermal neutron flux measured by said detectors is influenced more by epithermal neutron parameters than thermal neutron parameters,
    e. means responsive to said thermal neutron flux measurements for producing a first output signal representative of the ratio of said measurements, said output signal being indicative of the formation porosity, and
    f. means responsive to said first output signal and at least one of said thermal neutron flux measurements for producing a second output signal indicative of the macroscopic absorption cross section of the formation in accordance with a known relationship.

9. The system of claim 8 further including:
    g. means responsive to the depth of said borehole tool within the borehole for recording said first output signal in correlation with depth as an indication of formation porosity and for simultaneously recording said second output signal in correlation with depth as an indication of the macroscopic absorption cross section of the formation.

* * * * *

UNITED STATES PATENT AND TRADEMARK OFFICE
CERTIFICATE OF CORRECTION

PATENT NO. : 4,021,666
DATED : May 3, 1977
INVENTOR(S) : Linus S. Allen

It is certified that error appears in the above-identified patent and that said Letters Patent are hereby corrected as shown below:

Column 2, line 31, in Equation (4) the portion "(1 - 100)" should be --(1 - $\varphi$)--.

Signed and Sealed this nineteenth Day of July 1977

[SEAL]

Attest:

RUTH C. MASON
*Attesting Officer*

C. MARSHALL DANN
*Commissioner of Patents and Trademarks*